F. C. KRÜGER.
STUFFING BOX.
APPLICATION FILED DEC. 15, 1909.
978,310.
Patented Dec. 13, 1910.
2 SHEETS—SHEET 1.
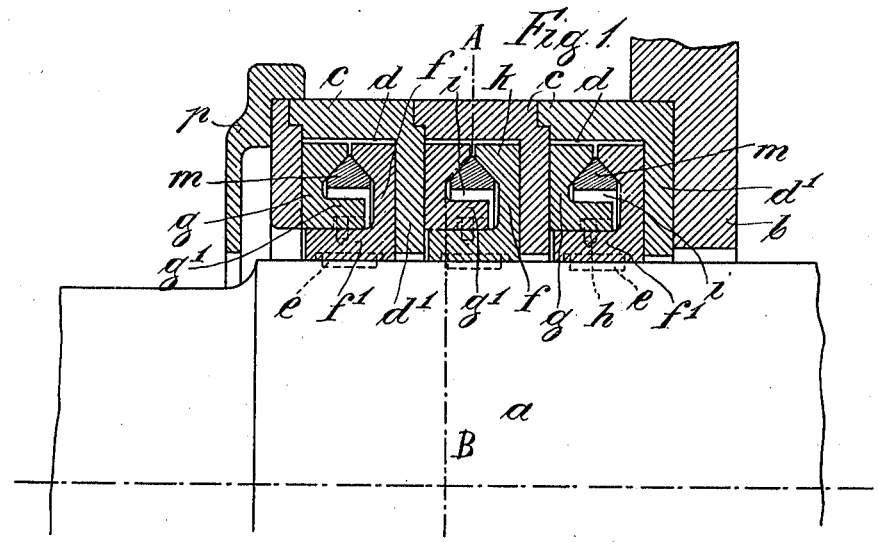
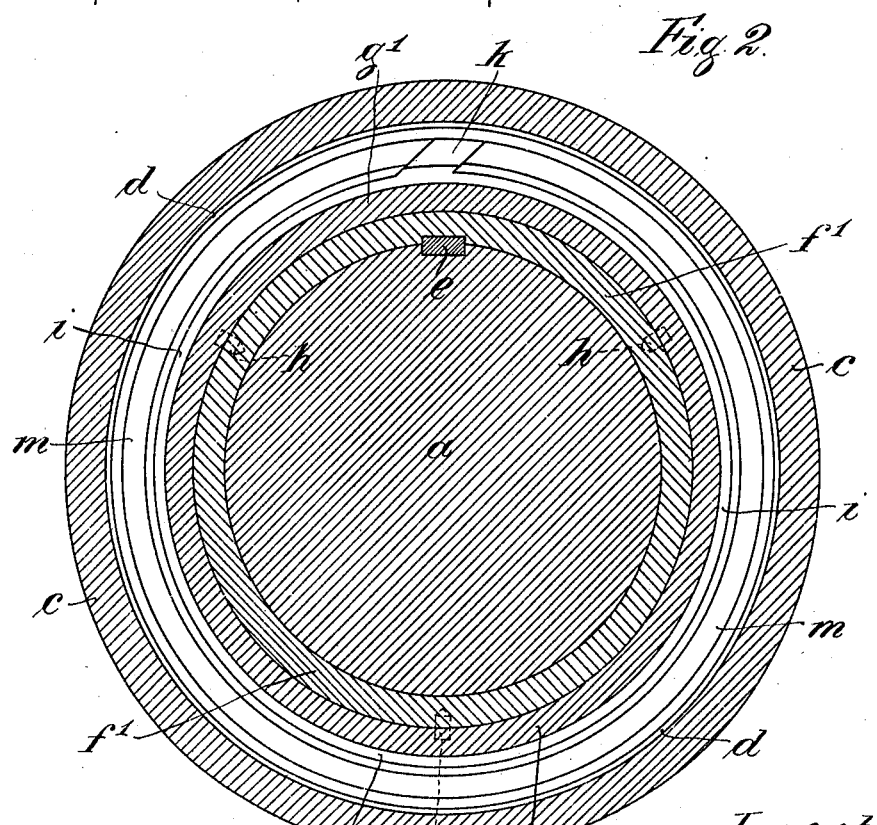
Witnesses:
Corinne Myers
Thomas Donnellan
Inventor:
Friedrich Carl Krüger
by L. K. Böhm,
Attorney

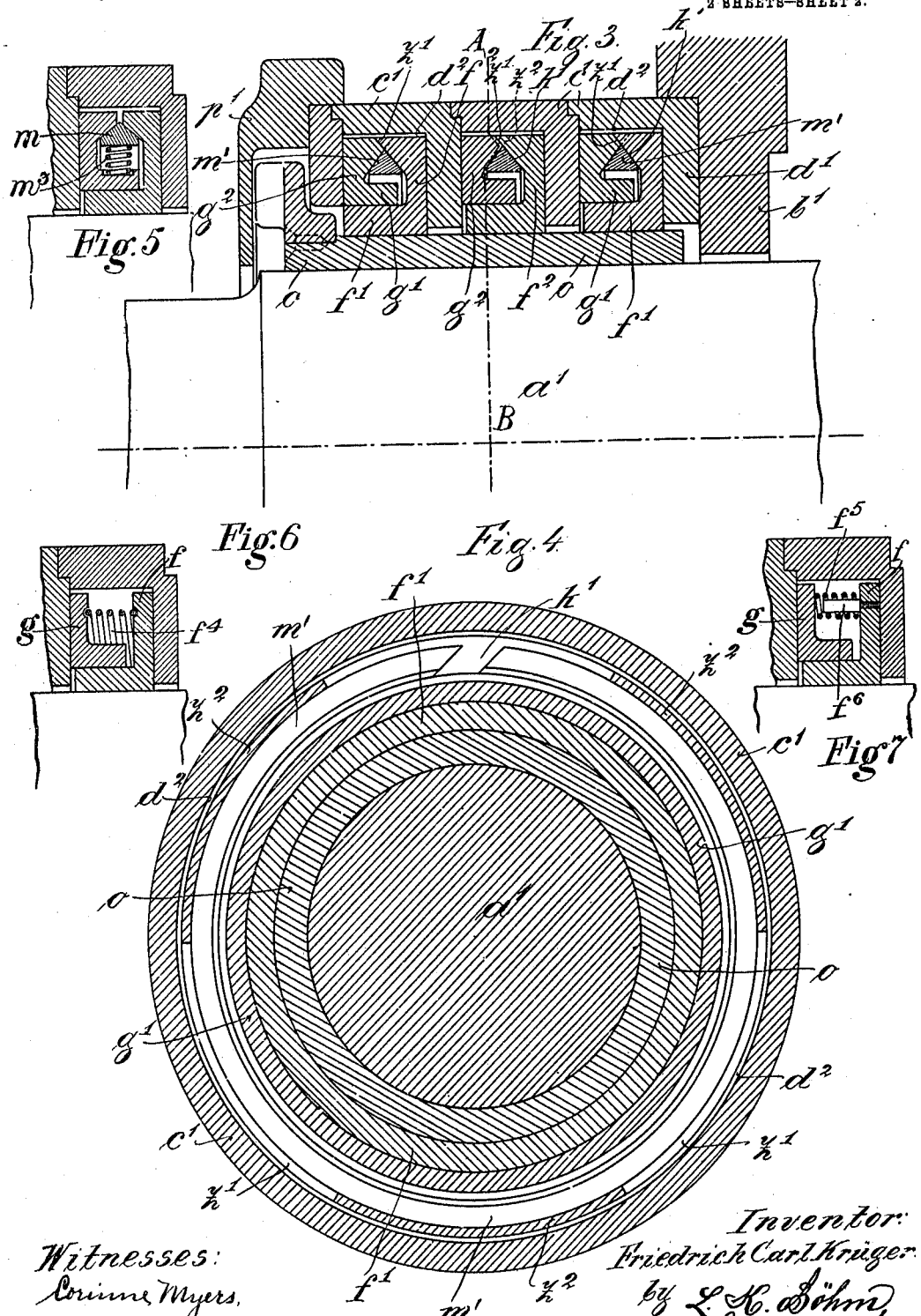

though rough
UNITED STATES PATENT OFFICE.

FRIEDRICH CARL KRÜGER, OF HANOVER, GERMANY.

STUFFING-BOX.

978,310.

Specification of Letters Patent.  Patented Dec. 13, 1910.

Application filed December 15, 1909. Serial No. 533,246.

*To all whom it may concern:*

Be it known that I, FRIEDRICH CARL KRÜGER, a subject of the King of Prussia, German Emperor, and resident of 1 Waldstrasse, Hanover, in the German Empire, have invented certain new and useful Improvements in Stuffing-Boxes, of which the following is a specification.

The subject of the present invention is an improved stuffing-box of the character of labyrinth-stuffing boxes which is shorter in its length and more simple than the known stuffing boxes of that kind, as the old labyrinth-stuffing boxes must have a great number of grooves or chambers, as the tightening of same depends only from the number and length of the grooves.

According to the present invention the tightening surfaces are arranged vertically to the axis, viz. on rings which are fastened to and rotating with the shaft, but which rings at the same time are pressed axially so as to bear against fixed counter-faces. These counter-faces are formed by the walls of chambers, and the rings are arranged in these chambers preferably in such a way that the one of the packing rings is fastened tightly to the shaft or to a shaft-surrounding shell, while the other ring rests in a tightly fitted manner upon the nave-part of the first ring. The first ring is fastened to the shaft in such a way, as to rotate with same, and the second ring is taken along by the first one by any of the later described means. Between both rings there are inserted means which have the tendency to press the rings away from each other, so as to bear permanently against the front faces of the chamber walls. For this pressing from each other of the rings there may be used self-tension rings which are in the space between both packing rings and which tension rings bear against inclines of the packing rings in such a way that their radial spring-tension produces an axial component upon the packing rings. The tension of the spring-rings may be aided by other additional springs, for instance coiled springs, and further in the case of quickly rotating shafts the centrifugal force upon the tension ring will act in assistance of their natural tension. There may be used even coiled springs, the axis of which may be parallel to the shaft, in substitute for the rings for the pressing of the packing rings against the walls.

In the accompanying drawings Figure 1 shows a longitudinal section through a stuffing box, Fig. 2 a cross section according to the dash-dotted line A—B of Fig. 1, Figs. 3 and 4 show a corresponding longitudinal and transverse section of another embodiment. Figs. 5, 6 and 7 are detail views showing various arrangements of springs.

In the first example according Figs. 1 and 2 the rotating shaft $a$ of the machine passes through the cover $b$ of the cylinder. Some rings $c$ of angle-section form the chambers $d$, whereby the disk parts $d'$ of these angle-rings $c$ do not touch the shaft $a$. On the shaft $a$ there are fastened the tightening rings $f$ of angle-section, so that their nave-parts $f'$ may slide axially but cannot move radially in consequence of the key-connection $e$ between both parts. Further there are supported by the naves $f'$ rings $g$ of angle-section, whereby the plugs $h$ or keys in the grooves of the naves $g'$ of said rings allow an axial movement of the rings $g$ with reference to the rings $f$, but prevent a radial movement or turning movement between those parts. The ring-shaped free space $i$ between both the tightening rings $f$ and $g$ is shaped roof-like, and a spring-ring $m$ presses against the inclines $k$ of said roof-faces. The tightening surfaces of the stuffing box are arranged between the radial planes of the rings $f$ and $g$ and the radial plane of the disk-part $d'$ of the chamber-walls $d$. The action of the springs $m$ may be assisted by additional coiled spring rings, which are inserted between the nave $g'$ and the inner wall of said rings $m$.

According to the embodiment of Figs. 3 and 4 there are used again spring rings $m'$ rings $f^2$ and $g^2$ which rings however are not supported directly on the rotating shaft $a'$, but on a sleeve $o$ which is shrunk on the shaft $a'$. The connection between the rings $g^2$ and the rings $f^2$ is not effected by plugs $h$, as in the foregoing example, but by the teeth $z'$ $z^2$, which are formed on the inclined roof-parts $k'$ of the rings $f^2$ and $g^2$. Fig. 4 shows the front view of such teeth.

The split spring rings $m$ and $m'$ may be supported and assisted by a series of spiral springs $m^3$ as shown in Fig. 5. As shown in Fig. 6 the coned split spring ring $m$ or $m'$ and corresponding coned surfaces on the flanges $f$ and $g$ or $f^2$ and $g^2$ may be dispensed with and the flanges may be pressed apart by a single coiled spring $f^4$, or instead of a single coiled spring $f^4$ the flanges $f$ and $g$ or $f^2$ and $g^2$ may be pressed apart by a series of spiral springs $f^5$, of which one is shown in section in Fig. 7. The springs $f^5$ may be supported in a suitable manner on one of the flanges, for instance by pins $f^6$ on the flange $f$.

In both examples the readjusting of the stuffing-box by the flange of the gland and the other details are performed in the well known manner.

I claim:—

1. In a stuffing box for rotary shafts, the combination with the shaft of a divided casing, means for connecting the parts of said casing together, a plurality of internal radial flanges on said casing, a pair of radial flanges surrounding said shaft and located between a pair of flanges on said casing, means for connecting said flanges to said shaft so as to cause said flanges to rotate with said shaft while permitting an axial movement of said flanges with respect to said shaft so as to enable each of said last mentioned flanges to make contact with a side face of the corresponding flange on said casing and elastic means tending to maintain contact between the said pair of flanges on said shaft and the flanges on said casing.

2. In a stuffing box for rotary shafts, the combination with the shaft of a sectional casing, comprising a plurality of internal radial flanges, means for connecting the sections of said casing together, a pair of radial flanges surrounding said shaft and located between a pair of flanges on said casing, means for connecting said flanges to said shaft so as to cause said flanges to rotate with said shaft while permitting an axial movement of said flanges with respect to said shaft so as to enable each of said last mentioned flanges to make contact with a side face of the corresponding flange on said casing and elastic means tending to maintain contact between the said pair of flanges on said shaft and the flanges on said casing.

3. In a stuffing box for rotary shafts, the combination with the shaft of a divided casing, means for connecting the parts of said casing together, a plurality of internal radial flanges on said casing, a pair of radial flanges surrounding said shaft and located between a pair of flanges on said casing, means for connecting said flanges to said shaft while permitting an axial movement of said flanges with respect to said shaft so as to enable each of said last mentioned flanges to make contact with a side face of the corresponding flange on said casing, a split spring ring located between said pair of flanges a coned surface at the outer periphery of said ring at each side thereof and corresponding coöperating coned surfaces on adjacent faces of said pair of flanges.

4. In a stuffing box for rotary shafts, the combination with the shaft of a divided casing, means for connecting the parts of said casing together, a plurality of internal radial flanges on said casing, a collar on said shaft located between a pair of flanges on said casing, a radial flange on said collar, means for connecting said collar to said shaft so as to cause said collar to rotate with said shaft while permitting an axial movement of said collar with respect to said shaft, a second collar on the first named collar, a radial flange on said second collar, means for causing said collars to rotate together while permitting a relative axial movement, and elastic means tending to maintain contact between the flanges on said collars and the said pair of flanges on said casing.

5. In a stuffing box for rotary shafts, the combination with the shaft of a divided casing, means for connecting the parts of said casing together, a plurality of internal radial flanges on said casing, a collar on said shaft located between a pair of flanges on said casing, a radial flange on said collar, means for connecting said collar to said shaft so as to cause said collar to rotate with said shaft while permitting an axial movement of said collar with respect to said shaft, a second collar on the first named collar, a radial flange on said second collar, means for causing said collars to rotate together while permitting a relative axial movement, a split spring ring located between the pair of flanges on said collars, a coned surface at the outer periphery of said ring at each side thereof and corresponding coöperating coned surfaces on adjacent faces of the flanges on said collars.

6. In a stuffing box for rotary shafts, the combination with the shaft of a divided casing, means for connecting the parts of said casing together, a plurality of internal radial flanges on said casing, a collar on said shaft located between a pair of flanges on said casing, a radial flange on said collar, means for connecting said collar to said shaft so as to cause said collar to rotate with said shaft while permitting an axial movement of said collar with respect to said shaft, a second collar on the first named collar, a radial flange on said second collar, means for causing said collars to rotate together while permitting a relative axial movement, a split spring ring located between the pair of flanges on said collars, a coned surface at the outer periphery of said ring at each side thereof, and a series of radially arranged spiral springs adapted to support and assist the said split spring ring.

7. In a stuffing box for rotary shafts, the combination with the shaft of a divided casing, means for connecting the parts of said casing together, a plurality of internal radial flanges on said casing, a sleeve secured to said shaft, a pair of radial flanges surrounding said sleeve, and located between a pair of flanges on said casing, means whereby said pair of flanges are caused to rotate with said sleeve while permitting an axial movement of said pair of flanges so as to enable each of said pair of flanges to make contact with a side face of the corresponding flange on said casing and elastic means to maintain contact between the said pair of flanges on said sleeve and the flanges on said casing.

In witness whereof I have hereunto set my hand in the presence of two witnesses.

FRIEDRICH CARL KRÜGER.

Witnesses:
OTTO SÜDCKÜM,
ROBT. J. THOMPSON.